United States Patent Office 2,701,508
Patented Feb. 8, 1955

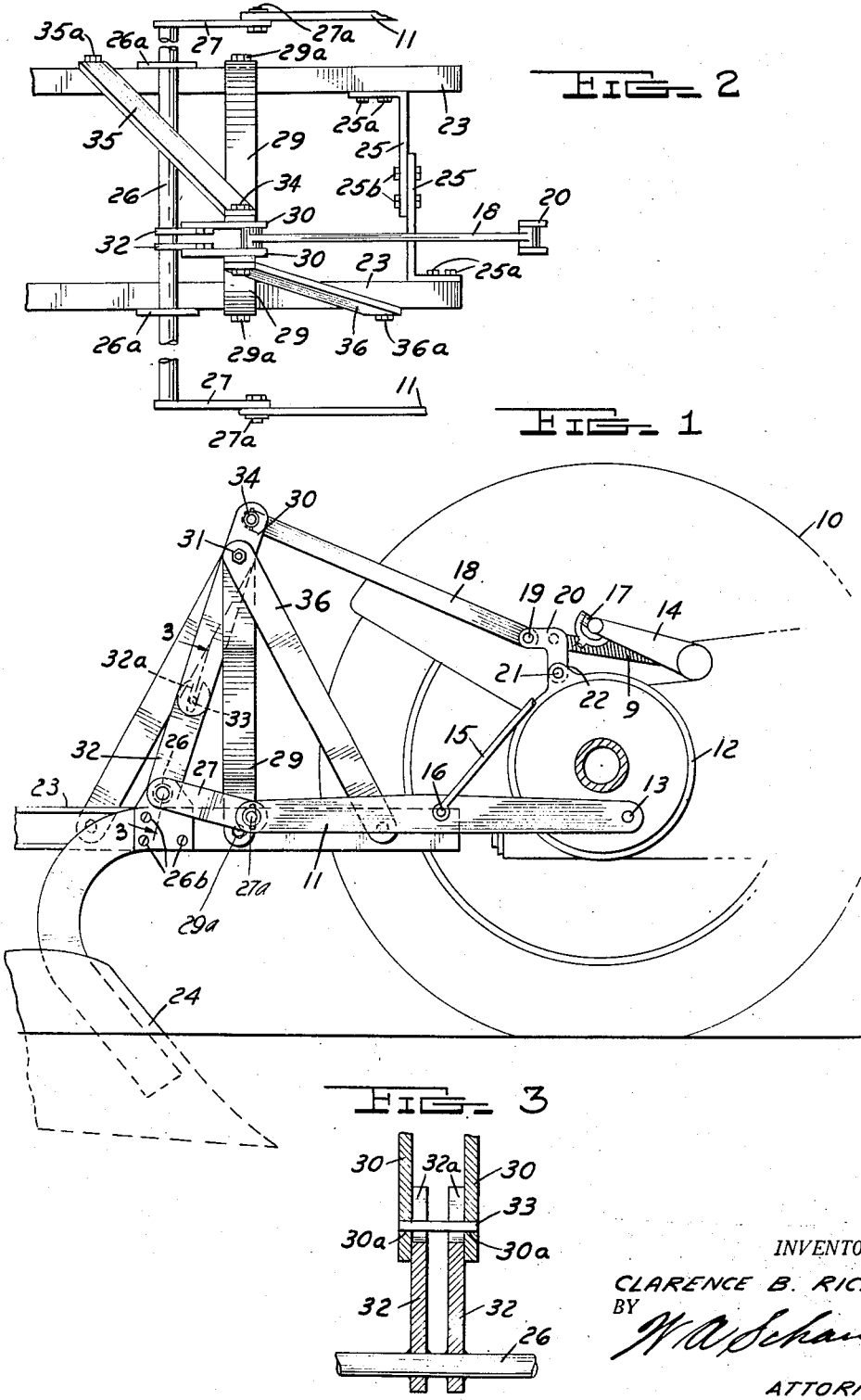

2,701,508

SELF-ADJUSTING PLOW HITCH

Clarence B. Richey, Royal Oak, Mich., assignor, by mesne assignments, to Ford Motor Company, Dearborn, Mich., a corporation of Delaware Application February 7, 1950, Serial No. 142,853

10 Claims. (Cl. 97—46.07)

This invention relates to an improved plow hitch for mounting a moldboard plow on a hydraulically operated tractor hitch mechanism whereby the plow automatically seeks the proper penetration angle in entering the ground.

Lift type moldboard plows are generally mounted behind a tractor in such a manner that the penetration angle of the plow relative to the ground is fixed. While this general characteristic may have some advantages in simplicity, there are also substantial disadvantages to such an arrangement due to certain variable factors which affect proper operation of the plow. It is well known that the condition of the plow share and the type of soil in which the plow is working very definitely determines to a large extent just how well the plow will penetrate the soil. Obviously, if the share is new or the soil is light, little difficulty will be experienced in securing penetration. However, as the share becomes dulled or when working in hard soil the plow tends to "ride out" of the soil. With a fixed penetration angle on the plow little can be done to compensate for this situation.

It is therefore desirable to provide a plow hitch for a lift type moldboard plow so constructed that the angle of penetration of the plow relative to the ground is automatically adjusted to permit the plow to seek its optimum penetration angle, whereby improved plowing performance will be obtained. Such an arrangement is particularly desirable for automatically adjusting the penetration angle of the plow as the share becomes worn or when plowing in heavy soil where a greater penetration angle is required to make the plow work effectively.

Accordingly, it is an object of this invention to provide an improved hitch arrangement for a lift type moldboard plow whereby the penetration angle of the plow bottom is self-adjusting in response to varying plowing conditions.

Another object of this invention is to provide an improved plow hitch for a tractor having a pair of transversely spaced, vertically swingable, power lifted, trailing draft links and a top link connecting member, for mounting a plow on such links in such manner that the penetration angle of the plow is automatically adjusted in response to varying plowing conditions.

The specific nature of this invention, as well as other objects and advantages thereof, will become apparent to those skilled in the art from the following detailed description, taken in conjunction with the attached sheet of drawings on which, by way of preferred example only, are illustrated an embodiment of this invention.

On the drawings:

Figure 1 is a side elevational view of a moldboard plow mounted on the trailing draft links of a tractor by a hitch constructed in accordance with this invention.

Figure 2 is a plan view of Figure 1.

Figure 3 is an enlarged detailed sectional view taken along the plane 3—3 of Figure 1.

As shown on the drawings:

In Figure 1 there is shown the rear end portion of a tractor 10 of well known make with one wheel removed to better illustrate the mounting of the various elements thereon. Tractor 10 is provided with a pair of transversely spaced trailing draft links 11 pivotally connected to the axle housing 12 of tractor 10 at 13. Links 11 are raised vertically by a pair of spaced lifting arms 14, operable by a hydraulic ram (not shown) which is mounted within the tractor, through the connection of rods 15 respectively pivotally connected as at 16 to links 11 and at 17 to lifting arms 14. A built-in draft control mechanism (not shown) is provided, as is conventional, to automatically raise or lower links 11 in response to soil reaction forces on the drawn implement to maintain a constant draft on the tractor. Such soil reaction forces are transmitted to a spring 9 of the draft control mechanism by a top link 18 which is pivotally connected at 19 to an L-shaped lug 20 which in turn is pivotally connected at 21 to a lug 22 provided on top of axle housing 12.

A pair of parallel, transversely spaced plow beams 23 of the usual configuration are provided and on each of such beams there is mounted a conventional moldboard plow bottom 24. Plow beams 23 are spaced apart at their forward ends as shown in Figure 2 by a pair of L-shaped brackets 25 secured to respective beams 23 by bolts 25a and each bracket 25 in turn is secured to the other by bolts 25b. Beams 23 are spaced apart at their rear ends by a cross shaft or drawbar 26 rotatably mounted transversely of plow beams 23 by apertured plates 26a secured to respective beams 23 by bolts 26b. A crank arm 27 is welded or otherwise rigidly secured to each end of cross shaft 26, such cranks being aligned as shown in Figures 1 and 2, and a horizontal pin 27a is secured by welding to the free end of the respective cranks 27. Pins 27a permit the tractor draft links 11 to be mounted on such pins as shown in Figures 1 and 2.

A pair of vertically disposed strap members 29 are secured in opposed relationship to respective beams 23 by bolts 29a and the top portions of such straps are bent inwardly to define an upstanding A-frame. The A-frame defined by strap members 29 is further braced by a pair of oppositely sloping strap like braces 35 and 36 which have their bottom ends respectively secured to beams 23 by bolts 35a and 36a while the upper ends are secured to the A-frame by the spacer bolt 29b.

A pair of spaced parallel, rearwardly sloping lever members 30 are pivotally secured to the upper ends of strap members 29 by a transverse bolt 31. Lever members 30 project above the top of the A-frame and the trailing end of the tractor top link 18 is pivotally connected between such upper ends of levers 30 by a transverse linch pin 34.

A pair of spaced arms 32 are welded approximately in the center of cross shaft 26 and such arms are displaced at approximately 90 degrees with respect to crank members 27 so that such crank members will be in substantial alignment with levers 30 when in the position shown in Figure 1. Each end of arm 32 is bifurcated as shown at 32a and such bifurcated arm ends slidably engage a transverse pin 33 supported within suitable apertures 30a provided in the lower end of levers 30. Such construction provides a slip connection between arms 32 and levers 30 whereby arms 32 may be rotated to effect rotation of levers 30 to change the relative position of the rear pivot point of top link 18 thus changing the effective length of such link for a purpose to be presently described.

It should be noted that the angular relationship between crank arms 27 and arms 32 is such that the jackknifing of crank arms 27 relative to draft links 11 is produced in a downward direction from their straight line or extended position.

In plowing with the above described hitch arrangement, the customary draft control lever (not shown) on the tractor is adjusted to a selected position which, through the operation of the well-known hydraulic draft control mechanism on the tractor, will determine the maximum tractive effort which the plow will be permitted to require from the tractor. In initiating plowing the setting of such hydraulic control lever automatically produces a lowering of draft links 11 and, assuming the tractor is in motion, the plows carried by the plow beams will engage the soil. The initial engagement of the plows with the soil will tend to produce a pivoting of the entire plow frame in a clockwise direction, as viewed in Figure 1, about the axis of cross shaft 26. This tendency of the plow frame to rotate results in the application of a pivoting force to the lever 30 tending to pivot this lever in a counter-clockwise direction about the relative stationary pivotal axis defined by the end of the top link 18. This pivotal tendency of lever 30 is, of course, transmitted through the arms 32 to produce a clockwise shifting of the cross shaft 26 relative to the plow frame. As a result, the penetration angle of the plow bottoms carried by the plow frame is increased and concurrently, a downwardly directed force is exerted upon the draft links 11 of the tractor by the rotational tendencies of the cross shaft 26 as transmitted by cranks 27. This force directly opposes the inherent tendency of crank arms 27 and draft links 11 to straighten out, hence reducing the sensitivity of the system somewhat, which, in certain applications, may be desirable to prevent excessive hunting of the system. The plow will continue to penetrate deeper into the soil until the draft effort required from the tractor, as measured by the compression force transmitted by upper link 18 to control spring 9, will exceed the selected draft effort as determined by the position of the draft control lever (not shown) and, as a result, a lifting force will be applied to the draft links 11 by the tractor hydraulic mechanism. The lifting force supplied to the draft links 11 results in a counter-clockwise shifting of the cross shaft 26 through the crank arms 27, and this results in a clockwise rotation of lever 30 which has the effect of shifting the top of the A-frame of the plow rearwardly and hence, reducing the effective penetration angle of the plow bottoms. Thus the plow bottoms ride upwardly in the soil to a point where the selected draft effort is exerted on the tractor, whereupon the lifting forces on the draft links will be effectively balanced. If the plow then starts running too shallow so as to exert less than the selected draft effort on the tractor, the lifting force applied to the draft links 11 is automatically reduced by the conventional operation of the hydraulic mechanism, the draft links 11 are permitted to lower and the entire plow will pivot to an increased penetration angle as described above and hence achieve a lower plowing depth.

As is well known, difficulty has been encountered prior to the present invention when plowing in hard soil where penetration is difficult, or when plowing with a dull or worn share, since the plow would not normally achieve the prior depth as determined by the selected position of the conventional draft control lever on the tractor. However, by use of the present invention, no lifting force will be applied to the draft links 11 by the hydraulic system until the actual draft force equals that selected by the operator, and until such draft forces are generated, the plow hitch will function as described above to automatically attain an increased penetration angle relative to the ground and achieve penetration by virtue of such angle until the selected draft effort is exerted on the tractor.

It should be apparent that range of adjustment of the penetration angle is a function of the relative lengths of levers 30 and arms 32 and that a wide range of automatic adjustment can be obtained without substantially increasing the effective length of the draft connection between the plow and tractor.

It will thus be apparent that there is here provided an improved ground engaging implement hitch of simplified construction which permits the effective penetration angle of such implement to be automatically adjusted in accordance with varying draft forces exerted by the implement whereby optimum performance of the implement is obtained regardless of soil conditions or sharpness of the ground engaging tool.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a tractor having a pair of power lifted, transversely spaced vertically swingable draft links and an intermediate top link, an implement comprising an implement frame, a drawbar rotatably mounted transversely of the implement frame, a first crank member secured on each end of said drawbar, means for respectively mounting the draft links on said crank members, a vertical support member on the implement frame, a lever pivoted intermediate its ends on said vertical support member, means for pivotally connecting the upper end of said lever to the top link, and a second crank on said drawbar connected to said lever at its lower end.

2. For use with a tractor having a pair of transversely spaced vertically swingable hydraulically lifted draft links and an intermediate top link, a plow frame including a pair of transversely spaced beams, a cross shaft rotatably mounted transversely of said beams, a first crank arm secured to each end of said cross shaft in aligned relationship, means for mounting the draft links on said respective crank members, a vertical support member mounted on said beams, a lever pivoted intermediate its ends on said vertical member, means for pivotally connecting the upper end of said lever to the top link, and a second crank on said drawbar connected to said lever at its lower end, all of said cranks rotating in response to lowering of said draft links to rotate said lever for shortening the effective length of the top link thereby increasing the angle of penetration of the plow relative to the ground.

3. For use with a tractor having a pair of transversely spaced, power liftable, trailing hitch links, power means for lifting said hitch links, a control mechanism for actuating said power means upon subjecting said control mechanism to a compressive force, and a top link connected to said control mechanism for transmitting an actuating compressive force thereto, a soil working implement having a frame and a ground engaging tool depending from said frame, a cross shaft mounted on said frame for arcuate movement about a transverse axis, first crank means on said cross shaft for pivotally connecting to said hitch links, a rigid upstanding structure on said frame, a lever medially pivoted on said upstanding structure, a second crank means on said cross shaft operably connected to one end of said lever to pivot said lever as said cross shaft is arcuately moved, and means for connecting the other end of said lever to said top link to apply a compressive force thereto as a function of soil reaction force on said tool, whereby variations in draft requirements of said implement produce compensating variations in penetration angle of said frame relative to said draft links.

4. For use with a tractor having a pair of transversely spaced power liftable, trailing hitch links, power means for lifting said hitch links, a control mechanism for actuating said power means upon subjecting said control mechanism to a compressive force, and a top link connected to said control mechanism for transmitting an actuating compressive force thereto, a soil working implement having a frame and a ground engaging tool depending from said frame, a cross shaft mounted on said frame for arcuate movement about a transverse axis, first crank means on said cross shaft for pivotally connecting to said hitch links, a rigid upstanding structure on said frame, a lever medially pivoted on the top of said upstanding structure, a second crank means on said cross shaft operably connected to the lower end of said lever to pivot said lever as said cross shaft is arcuately moved, and means for connecting the other end of said lever to said top link to apply a compressive force thereto as a function of soil reaction force on said tool, whereby variations in draft requirements of said implement produce compensating variations in penetration angle of said frame relative to said draft links.

5. In a tractor having a pair of power-lifted, vertically swingable draft links and a top link, a ground-engaging implement comprising spaced longitudinal implement beams normally extending substantially parallel to the ground, a transverse cross-shaft spanning said beams, means carried by said beams journaling said cross-shaft for rotation about its longitudinal axis, separate crank arms carried by said cross-shaft for rotation therewith and adapted for pivotal connection to said draft links, a lever medially pivoted to said implement, means for pivotally securing said top link to one end of said lever, and means connecting said lever to said cross-shaft, said lever being pivotally movable as a consequence of cross-shaft rotation, said separate crank arms pivoting relative to said draft links upon vertical draft link movement to rotate said cross-shaft relative to said beams, thereby varying the effective distance of said cross-shaft from said draft links to change the effective length of said top link and the inclination of said implement beams relative to the ground.

6. In a tractor-drawn plow having a ground-engaging plow bottom carried by a frame structure including a transversely extending drawbar angularly displaceable about an axis and adapted to be operatively connected to spaced trailing, tractor-mounted, vertically power-movable draft links and to a top link urged rearwardly by force transmitting means, the improvements which comprise crank arms joining said drawbar to said draft links to accommodate relative pivoting movement of said draft links and said frame structure and consequent tilting of said plow bottom to increase the angle of penetration thereof as said drawbar rotates in one direction, a medially pivoted upper pivot arm pivoted at one end to said top link, and a lower pivot arm operatively connected at one end to the free end of said upper pivot arm and at its other end to said drawbar for angular movement therewith, said pivot arms reacting against said top link as said drawbar rotates in said one direction to tilt said frame structure.

7. In combination, a plow and a hitch for connecting the plow in trailed relation to a tractor comprising a draft link adapted for pivotal mounting on the tractor for movement in a longitudinal vertical plane, a crank arm connecting said draft link and the plow for relative vertical movement, a compression link adapted for pivotal connection to the tractor and extending rearwardly toward the plow in vertically spaced relation to said draft link, a lever arm pivotally connected to said top link and said plow, and means interconnecting said lever arm and said crank arm responsive to vertical movement of said draft link with respect to said plow frame to shift said lever arm in accordance with the position of said draft link, thereby varying the pitch of the plow.

8. In a tractor-drawn implement having a ground-engaging part rigidly carried by a frame adapted for connection to a trailing tractor-mounted vertically movable draft link, the improvements which comprise a top link attachable to the tractor and extending rearwardly to overlie the implement frame, a depending lever arm pivoted at one end to the free rear end of said top link and medially pivoted to the implement frame, a cross-shaft disposed on said frame for angular movement about a horizontal axis, means linking said draft links and said cross-shaft to accommodate relative movement therebetween, and means operatively connecting the other end of said lever arm to said cross-shaft to accommodate relative movement therebetween, said cross-shaft interconnecting said draft links and said lever arm so that relative movement of said frame and said draft links causes movement of said lever arm relative to said frame to vary the position of the pivotal connection of the lever arm to the implement frame and to correspondingly vary the inclination of said frame relative to the ground.

9. In a tractor-drawn implement having a ground-engaging part rigidly carried by an upstanding frame adapted for operative connection to a trailing tractor-mounted vertically movable draft link and to a top link, the inclination of said frame relative to the ground and the pitch of said ground-engaging part being determined by the length of said top link, the improvements which comprise an extension link pivotally connected to said draft link in generally trailing relation and movable vertically with respect to said draft link, an arm pivoted to the trailing end of said top link and to a corresponding upper portion of said frame, and means operatively connecting said extension links to said arm for actuating said top link to move relative to said frame upon relative frame-draft link movement, so that relative movement of said top link varies the effective length of said top link and the inclination of said frame relative to the ground.

10. In a tractor-drawn, ground-engaging implement having an implement frame including a transversely extending cross-shaft angularly displaceable about an axis and adapted to be operatively connected to a pair of spaced, tractor-mounted, vertically power-movable draft links and to a tractor-mounted top link, means interposed between and operatively connecting said cross-shaft and said draft links for angularly displacing said cross-shaft upon vertical movement of said draft links, and a pivot arm pivoted to the implement frame, said arm being interposed between and operatively connected to said cross-shaft and said top link, respectively, for varying the effective length of said top link relative to said implement frame as a consequence of angular displacement of said cross-shaft.

References Cited in the file of this patent

UNITED STATES PATENTS

| 2,118,180 | Ferguson | May 24, 1938 |
| 2,356,231 | Ferguson | Aug. 22, 1944 |

FOREIGN PATENTS

| 556,859 | Great Britain | Oct. 26, 1943 |
| 628,907 | Great Britain | Sept. 7, 1949 |